(12) United States Patent
Pakula et al.

(10) Patent No.: US 9,178,931 B2
(45) Date of Patent: Nov. 3, 2015

(54) METHOD AND SYSTEM FOR ACCESSING DATA BY A CLIENT FROM A SERVER

(71) Applicant: PIXIA CORP., Reston, VA (US)

(72) Inventors: Scott L. Pakula, Chantilly, VA (US); Rahul C. Thakkar, Sterling, VA (US)

(73) Assignee: PIXIA CORP., Reston, VA (US)

( * ) Notice: Subject to any disclaimer, the term of this patent is extended or adjusted under 35 U.S.C. 154(b) by 291 days.

(21) Appl. No.: 13/797,997

(22) Filed: Mar. 12, 2013

(65) Prior Publication Data

US 2014/0280465 A1    Sep. 18, 2014

(51) Int. Cl.
| G06F 15/16 | (2006.01) |
| H04L 29/08 | (2006.01) |
| G06F 17/00 | (2006.01) |

(52) U.S. Cl.
CPC .............. *H04L 67/02* (2013.01); *H04L 67/06* (2013.01); *H04L 67/1097* (2013.01)

(58) Field of Classification Search
CPC ... H04L 29/06047; H04L 67/02; H04L 67/06; H04L 67/1097
See application file for complete search history.

(56) References Cited

U.S. PATENT DOCUMENTS

| 7,640,363 | B2 * | 12/2009 | Teodosiu et al. ............... 709/247 |
| 8,069,225 | B2 * | 11/2011 | McCanne et al. ............. 709/219 |
| 8,260,853 | B2 | 9/2012 | Kong |
| 2010/0094847 | A1 * | 4/2010 | Malan et al. .................. 707/705 |
| 2010/0138485 | A1 | 6/2010 | Chow et al. |
| 2011/0196900 | A1 | 8/2011 | Drobychev et al. |
| 2012/0233228 | A1 | 9/2012 | Barton et al. |
| 2012/0233293 | A1 | 9/2012 | Barton et al. |
| 2012/0233522 | A1 | 9/2012 | Barton et al. |
| 2013/0325927 | A1 * | 12/2013 | Corbett et al. ................ 709/203 |
| 2015/0095972 | A1 * | 4/2015 | Sharma et al. ................... 726/1 |

OTHER PUBLICATIONS

International Search Report and Written Opinion dated Mar. 12, 2014 for PCT/US2014/024668.
International Preliminary Report on Patentability for PCT/US2014/024668 issued Sep. 24, 2015.

* cited by examiner

*Primary Examiner* — Wen-Tai Lin
(74) *Attorney, Agent, or Firm* — Pillsbury Winthrop Shaw Pittman, LLP

(57) ABSTRACT

A system and a method for accessing data by a client computer system from a server computer system, the client computer system including one or more processors configured to execute computer program modules, are described. The method includes receiving, by the client computer system from an application program, a read request to read at least a portion of a data file; sending, by the client computer system to the server computer system, a request for exact data corresponding to the at least the portion of the data file requested by the application program in the read request; receiving, by the client computer system from the server computer system, a response to the request including the exact data requested by the client computer system; and providing, by the client computer system to the application program, the exact data in response to the read request.

22 Claims, 4 Drawing Sheets

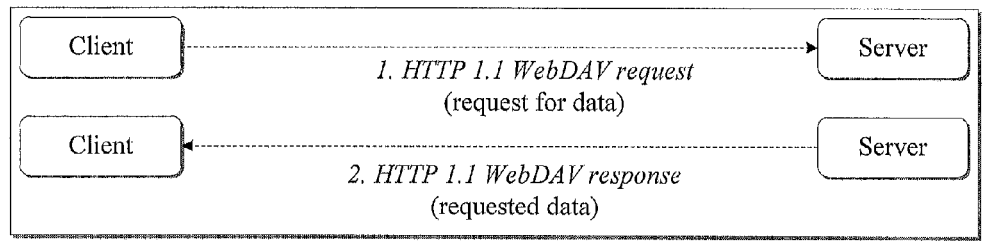
FIG. 1
(CONVENTIONAL)
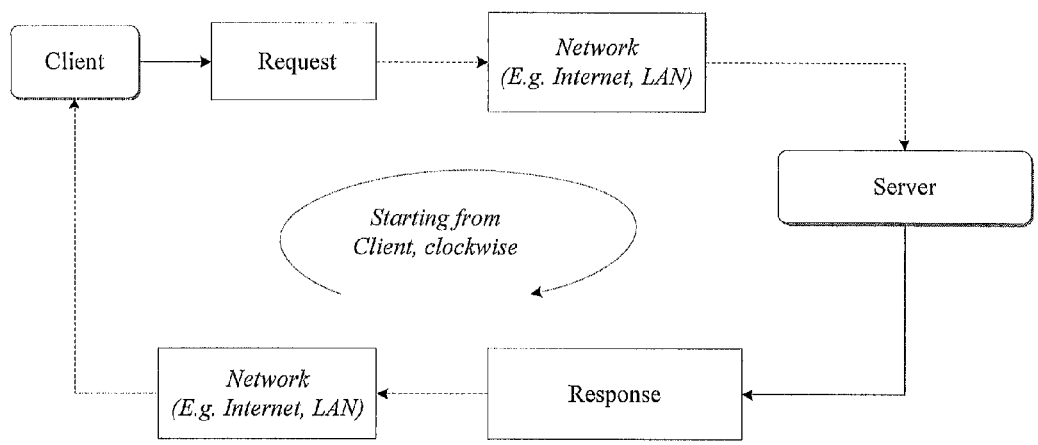
FIG. 2
(CONVENTIONAL)

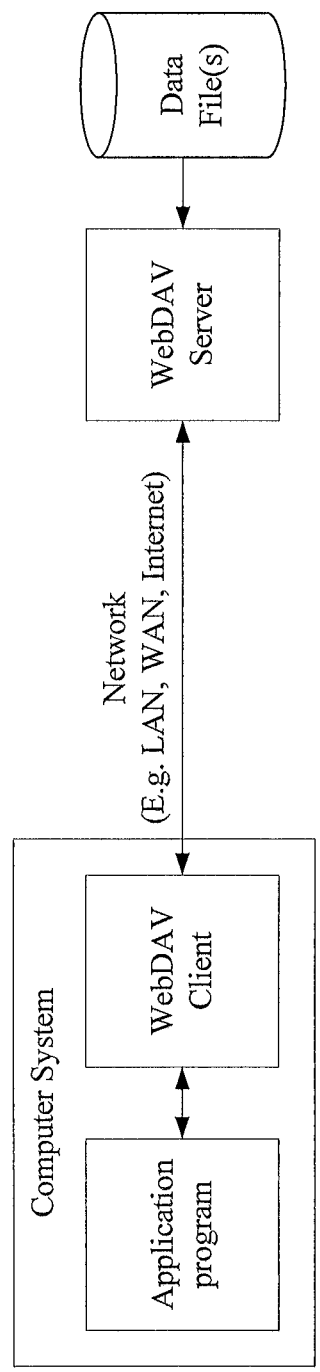
FIG. 3
(CONVENTIONAL)

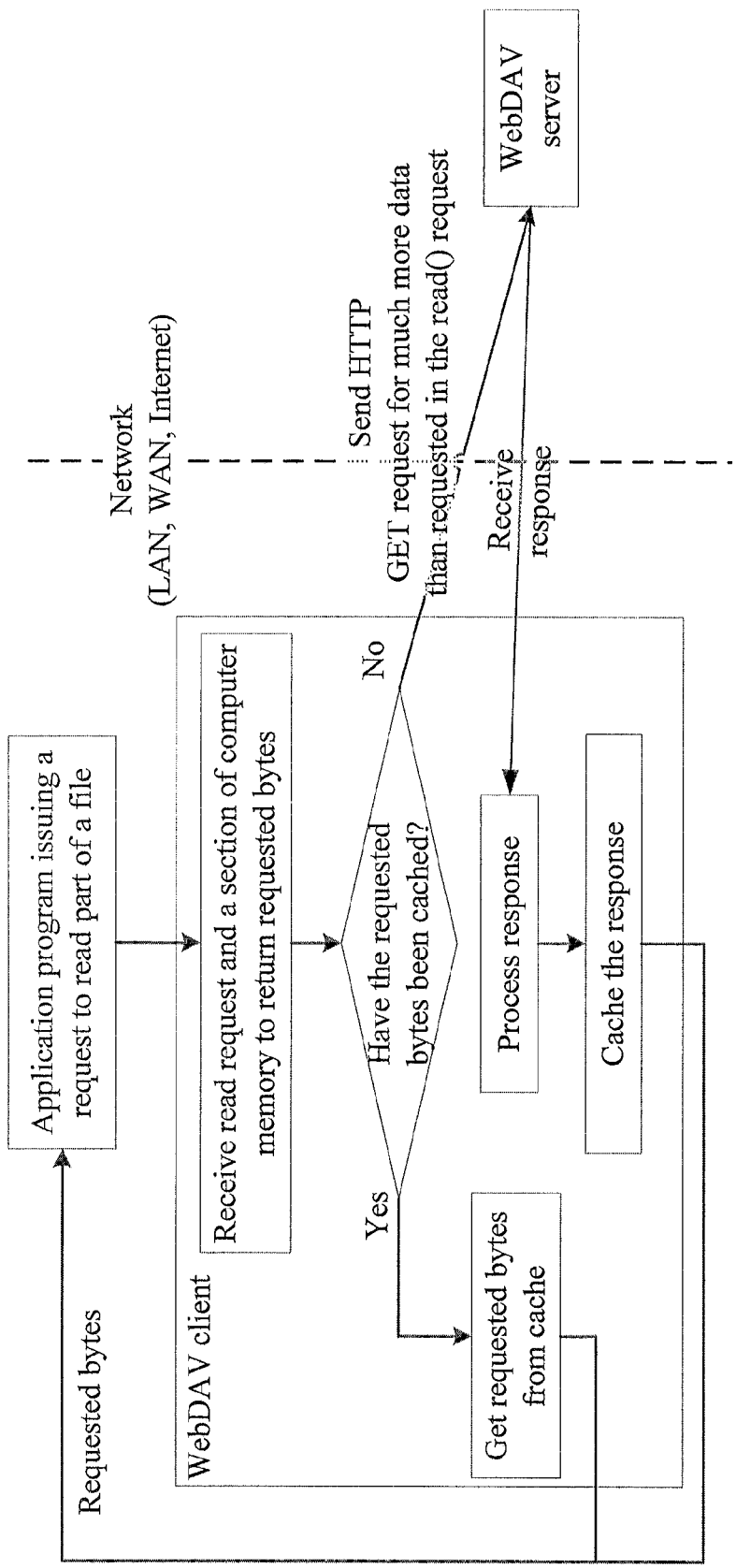
FIG. 4
(CONVENTIONAL)

METHOD AND SYSTEM FOR ACCESSING DATA BY A CLIENT FROM A SERVER

BACKGROUND OF THE INVENTION

1. Field of the Invention

The present invention pertains to a method and a system of accessing data, for example using a HTTP-based protocol.

2. Discussion of Related Art

An application program (also referred to herein as "an application"), a client program (also referred to herein as "a client") and a server program (also referred to herein as "a server") are computer software programs that run on a computer system (i.e., one or more computer systems having one or more processors). A computer system is a physical computer device such as, but not limited to, a desktop computer, a server computer, or a laptop computer; or a virtual computer device for example a Virtual Machine (VM). A computer system runs an operating system. An operating system provides access to one or more files stored on that computer system using a collection of computer software modules, also known as function calls. For example, an operating system such as Linux, can implement the published POSIX standard to provide a collection of function calls to open, close, read or write files.

Interchange of computer data using a client program and server program is a well-known technology. A client program communicates with a server program using a communication protocol over a network, for example a LAN, WAN or the Internet. Examples of a communication protocol are TCP, UDP, HTTP, HTTPS, socket-based communication, HTTP 1.1 WebDAV. A client sends a request for data to a server. Based on that request a server sends data that is a response to that request.

The client program and the server program may be running on the same computer or separate computers. A client program may be running on one or more computers. A server program may be running on one or more computers. The computers running clients and servers are connected to each other in some form over the network.

Server and client programs follow some type of communication protocol to be able to understand each other. A client asks a server about its capabilities. The server then responds with a list of services it offers. The client may utilize the services to fulfill its goals by making additional requests to the server.

The HTTP protocol is popular and a well-known standard for communicating over a computer network, for example LAN, WAN and the Internet or the World Wide Web (WWW). A current HTTP protocol version is HTTP 1.1 and is described in the IETF RFC 2616. An extension to the HTTP 1.1 protocol is HTTP 1.1 WebDAV. This protocol is described in IETF RFC 4918.

The HTTP 1.1 WebDAV protocol in its simplest form allows a computer to read from and write to web resources on a remote storage device using the WWW. A web resource can be a file. The protocol also supports the equivalent of hierarchical folder listings, file and folder metadata reporting, file and folder deleting and such features that existing traditional file-based file systems (for example, Portable Operating System Interface or POSIX-based file systems) offer, all of it over the WWW. In addition, the protocol also supports file versioning over the WWW. For example, the protocol allows for client programs to connect to remote storage solutions over the WWW and provision data at the remote location as if it were network mounted POSIX file system.

For example, the HTTP protocol supports the OPTIONS request which enables the server to provide a list of WebDAV commands that it supports and how. The WebDAV protocol implements some requests. The implementation of other WebDAV requests is optional. The PROPFIND request is used to retrieve properties and metadata from a resource. It is equivalent to getting properties and metadata about a file and getting a hierarchical directory or folder list. The MKCOL request is used to create collections. For example, a collection can be a directory or folder. The HTTP GET request is used to retrieve a complete or partial resource, for example a file, from a remote location on the WWW. The HTTP PUT request is used to store a complete or partial resource, for example a file, from a remote location on the WWW. The COPY request duplicates a resource, for example a file. For example, a detailed description of HTTP 1.1 WebDAV protocol, and HTTP 1.1 protocol can be found in IETF RFC 2616.

A storage cache or the method of storage caching is defined as a computer program component that transparently stores data on a storage device with relatively faster access or in computer memory so that future requests for the same data from a storage device with relatively slower access may be retrieved from the cache and delivered faster. If requested data is contained in the cache, the request can be fulfilled by simply reading from the cache, which can be relatively fast. Otherwise, the data can be fetched from the storage device containing the data, which can be relatively slower. A cache can be a portion of volatile computer memory (e.g. RAM), or non-volatile computer storage (e.g., solid state disk (SSD), hard disk, storage area network (SAN), or network attached storage system (NAS)).

A WebDAV client is a client program, which is a computer software program that runs on a computer system and using the WebDAV protocol for communication. The WebDAV client communicates with a WebDAV server (i.e., a server using a WebDAV protocol for communication). The WebDAV client implements a software abstraction layer between conventional file input output operations, for example POSIX function calls, implemented by an operating system on a computer system, and a WebDAV server. The WebDAV server is a computer software program that implements one or more versions of the WebDAV protocol.

A conventional implementation of a PROPFIND request may utilize storage caching of information on web resources. In this configuration, when a WebDAV client wants data about a resource, for example a file, hosted on a WebDAV server, the WebDAV client retains PROPFIND responses locally to avoid sending redundant requests to the WebDAV server when asking for data on the same resource again. In some instances, in anticipation of application programs that are running on the computer system that is also running the WebDAV client planning to ask for information on additional web resources, for example, files, a WebDAV client implementation may choose to pre-emptively request for data on those additional web resources and store them to a local cache.

A conventional implementation of an HTTP GET request by a WebDAV server is when an application makes a read request for a specific number of bytes from a specific part of a file that is being served by a WebDAV server. The WebDAV client runs on a computer system. An application program may also be running on the same computer system. The application program issues a read request to read a portion of a file. The file is located on a WebDAV server. As a result, the WebDAV client running on the computer system receives the read request. Instead of sending the read request to the WebDAV server, the WebDAV client first looks for this data in a local cache that the WebDAV client maintains. If the WebDAV client does not find the data in its local cache, the WebDAV client prepares to send a request to the WebDAV server. Instead of making the exact WebDAV GET byte-range request to retrieve only the data that is requested, the WebDAV client requests for more data, for example, the WebDAV client may send a request for the entire file to the server. This act of reading data that is not originally requested is performed in anticipation that the requesting application program and other following application programs may request other parts of the file. For example, if an application program asks for the first 8 Kilobytes from a 1024 Megabyte file, a conventional WebDAV client will send a WebDAV GET request to retrieve the entire 1024 Megabyte file. The WebDAV client would then store the 1024 Megabyte file on a local cache and only deliver the first 8 Kilobytes of this data that were originally requested by the application program. When the WebDAV client receives a subsequent read request for this file from an application program (i.e. the same application program or another application program on the same computer system), the WebDAV client on that computer system reads from the locally cached copy of the file to retrieve the requested data instead of making another WebDAV GET request to the server.

This conventional method of a WebDAV client managing read requests from an application and only issuing a GET request when data is not cached is applicable when a file is of a reasonable size, for example a few megabytes or a few gigabytes. In this case, the WebDAV client bears a one-time expense of downloading the entire file and then subsequent requests do not require further network access to the server. If the file is relatively large, for example, from several gigabytes to a few terabytes, the one-time expense (or investment) can be relatively high, as this may require a relatively large bandwidth and/or a relatively longer period of time to download the large file. A return on investment (ROI) may be even low, if the file is not needed any longer after the initial read. There are several other situations, some of which are discussed in this application where the process of explicit caching by a WebDAV client can be detrimental to system performance.

For example, consider a case where an application program acting as a WebDAV server implements a server program by using some of the methods described in the Provisional Patent Application No. 61/733,228, filed on Dec. 4, 2012, and entitled "METHOD AND SYSTEM FOR STORAGE AND DISSEMINATION OF DATA FILES AND VIRTUAL DERIVED DATA FILES", the entire content of which is hereby incorporated by reference, and that a computer software program acting as a WebDAV client implements the client program using some of the methods described in the 61/733,228 application. For example, as disclosed in the 61/733,228 application, a data file is defined as one or more bytes that exist in computer memory or on a computer storage device, such as a hard disk or a clustered storage device. A data file can be exposed to a computer program via a well-known interface, for example, an Object Storage Solution interface, or a POSIX file-system interface. One or more data files is referred as a collection of data files. The symbol D is used to indicate the one or more data files or collection of data files. A data file that is physically stored on a storage device is referred to as a first data file. A data file that is virtually presented to a consumer as if it were stored on a storage device but is not actually stored on a storage device, and is derived from the first data file, is referred to as a second virtual derived data file. A client program entrusts a server program with a first data file D that is of a known data type $T_D$. The goal for the client is to access the first data file D at a future time.

A client program may also have to access additional data of same or different data types that are derived from data file D at a future time. If the server program does not provide for such derived data or provide the ability to create such derived data, the client program ram would have to look for alternative services. If such services are not available, the client program has to generate the derived data by itself. Hence, a method for storing and retrieving data files on a storage device is provided. In one embodiment, the method allows for defining a data file virtualization policy that provides a client program with the ability to send the client program's intent to access the data stored in a first data file, as well as an intent of the client program to access data files of other data types that are derived from the first data file D. A data file virtualization policy is defined as the intent, by a client program, of accessing a first data file D, as well as derived data files $D_1, D_2 \ldots D_N$. One or more derived data files $D_1, D_2 \ldots D_N$ are derived from the first data file D, and are virtual. The term virtual implies that one or more data files $D_{1 \ldots N}$ do not physically exist on a storage device. The term virtual further implies that a directory listing of data files $D_{1 \ldots N}$ is available to the client program. The client program believes that data files exist on the server side storage device. The term virtual further implies that a derived data file $D_J$ (where, $1 \leq J \leq N$) is generated by the server program by reading the first data file D wholly or partially, dynamically, on-demand, when a client requests for that specific derived data file. A data file virtualization policy is denoted herein as $P_D$ or $P_{D(1 \ldots N)}$. A client program sends a first data file D (i.e., one or more first data files D) to a server program accompanied by a virtualization policy $P_D$ that corresponds to each first data file D in the one or more data files D. The one or more data files D are of the same data type $T_D$. When a server program receives the one or more first data files and $P_D$, from a client program, the server program takes the one or more first data files and $P_D$ and stores it on a storage device. Using either a database or a known structure or protocol, it associates the one or more first data files with virtualization policy $P_D$. For example, a known protocol would be for the server to save the one or more first data files and $P_D$ into the same server-side storage generated UUID for each file in the one or more first data files, into $P_D$. In this example, a first data file D would be one of the files in the one or more first data files. A client program sending to a server program, a first data file D and an associated first data file virtualization policy $P_{D(1 \ldots N)}$ using a computer network. D can be one data file of data type $T_D$ or it can be more than one data files of the same data type $T_D$. A client program does not know what derived data types are supported by a server program for a data file of data type $T_D$. Therefore, a client program may request a server program to send back a list of supported derived data types. The client program may also request a list of supported parameters for each supported derived data type. The parameters allow a client program to control the output of the derived data that will be subsequently generated on-demand by the server program. Once the list of supported parameters is known, a client program can announce its intent to request for all supported derived data types or only a subset of supported derived data types, at a future time.

In this case, the conventional method to implement a WebDAV GET request will not be efficient when one or more WebDAV GET requests are sent by a WebDAV client to the WebDAV server requesting for parts of a Virtual Derived Data File. For example, if multiple application programs running on multiple computer systems simultaneously request for different parts of the same virtual derived data file, each read request is sent to a corresponding WebDAV client running on the same computer system as the application program. If the WebDAV client uses a conventional method of implementing a WebDAV GET request, it can be shown that a WebDAV client program places unnecessary compute load on the WebDAV server program to generate parts of the virtual derived data file not originally requested by the client-side application program making the original read request. In one-time processing methods, such as some analytics algorithms for example object tracking methods, the original application program making the read request does not need more of the virtual derived data file than originally requested. Even if, in this case, the original application needs more virtual data file, it may be nearly impossible to predict what portion of that very large virtual derived data file the application may subsequently need.

Each WebDAV client program sends one or more WebDAV GET requests for a larger byte-range, including, but not limited to, asking for the whole file, from a virtual derived data file. More than one computer system having implementations of the WebDAV server may receive the multiple WebDAV GET requests for large portions of the same virtual derived data file. Each server computer system would then try to generate this virtual derived data file causing the server side computer system or systems to generate more bytes than required. These bytes from the file are retained in the WebDAV client's computer memory, and cached by the WebDAV client on a computer storage device for future use. However, the application program making the original read request to the WebDAV client, may not require that data.

If a client program issues multiple WebDAV GET requests to the server, each request asking for parts of the first data file that will not be accessed again for a period of time, the conventional method of implementing a WebDAV GET request will not be efficient. When the first data file, from which the virtual derived data file is derived, is a large data file, such as several gigabytes (e.g. 100 GB) to many terabytes (e.g. 3 TB), it may be inefficient to transfer a large portion of the file from the server to local storage attached to the computer system running the client program.

Therefore, there are several scenarios where the conventional method of implementing a WebDAV GET request may not efficient. As it can be appreciated, the example provided above is only one of many possible scenarios as there may be other scenarios that can contribute to proving that the conventional method of implementing a WebDAV GET request may not efficient under these other scenarios as well.

BRIEF SUMMARY OF THE INVENTION

An aspect of the present invention is to provide a method for accessing data by a client computer system from a server computer system, the client computer system including one or more processors configured to execute computer program modules. The method includes receiving, by the client computer system from an application program, a read request to read at least a portion of a data file; and sending, by the client computer system to the server computer system, a request for exact data corresponding to the at least the portion of the data file requested by the application program in the read request. The method further includes receiving, by the client computer system from the server computer system, a response to the request including the exact data requested by the client computer system; and providing, by the client computer system to the application program, the exact data in response to the read request.

Another aspect of the present invention is to provide a client computer system for accessing data from a server computer system. The client computer system comprises one or more processors configured to: receive, from an application program, a read request to read at least a portion of a data file; send, to the server computer system, a request for exact data corresponding to the at least the portion of the data file requested by the application program in the read request; receive, from the server computer system, a response to the request including the exact data requested; and provide, to the application program, the exact data in response to the read request.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1 depicts a client program making a request to a server program, and a server program responding to the client with a response to that request over a computer network using the HTTP 1.1 WebDAV specification;

FIG. 2 depicts a conventional client-server computer software program workflow;

FIG. 3 depicts a conventional WebDAV client-server computer software program workflow;

FIG. 4 depicts a conventional client implementation of an HTTP GET request with caching.

DETAILED DESCRIPTION OF EMBODIMENTS OF THE INVENTION

Figure 5:
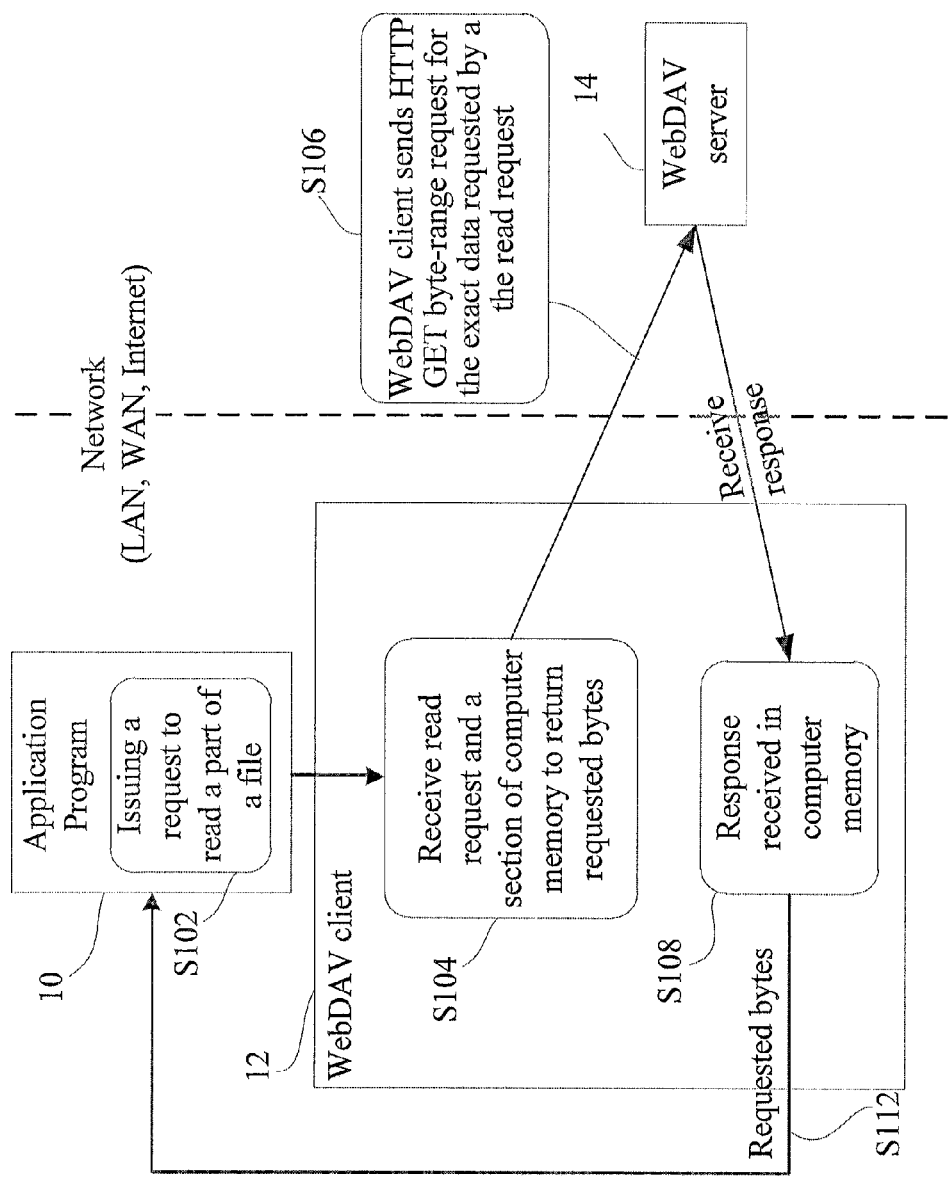
FIG. 5 depicts an embodiment of the present invention where a WebDAV client implements the Explicit Access method, according to an embodiment of the present invention.

An aspect of an embodiment of the present invention applies to problem sets that pertain to storage of a large quantity of large chunks of data across a globally federated enterprise. An aspect of an embodiment of the present invention applies to problem sets that pertain to retrieval of small portions or large portions of the stored data, for example, with a random access pattern. Another aspect of an embodiment of the present invention applies to problem sets where the data stored on a server computer system or systems is constantly being updated (e.g. deleted, appended, and changed). Random access patterns can be created by a large number of client programs running on a large number of computer nodes such that a probability of a client program running on the same computer node asking for the same data is very low (e.g., nearly zero). As a result, any local caching method for caching data may not be useful in this case FIG. 1 depicts a client program making an HTTP 1.1 WebDAV request to a server program and the server responding with a HTTP 1.1 WebDAV response comprising in-part of the data requested by the client program. With reference to the present invention, a client program is also a computer program that requests a server program to store data. In that case, a server program is a computer program that fulfills the request to store data from a client program and sends an appropriate response. A client program is also a computer program that requests for data and consumes it for a purpose. In that case, a server program is a computer program that provisions that data to a client program.

FIG. 2 depicts a conventional client-server application workflow. A client program (client) generates a request for a server program (server) and sends it to the server program over a computer network (e.g., Internet, LAN, WAN, etc.). The server program receives the request from the client program, processes the request and generates a response. The response is sent by the server program back to the client program over a computer network (e.g., Internet, LAN, WAN, etc.). The client program receives the response. This cycle of request-response can be repeated a plurality of times.

FIG. 3 depicts an example of a conventional WebDAV client (i.e., a client that implements the WebDAV protocol) performing a cached HTTP GET request. A WebDAV client program runs on the same computer system as the application program making a request to read a portion of a file. To read the portion of a file, the application program issues a read request, for example using a POSIX function call read( ) If the read request happens to be for data within a file being served by a WebDAV Server (i.e., a server that implements a WebDAV protocol), the read request is sent to the WebDAV Client. The WebDAV Server is running on a separate computer system that is connected with the WebDAV client over a network connection, e.g. LAN, WAN or Internet. The WebDAV Server reads data from the storage system that contains the requested file. The storage system that contains the requested file is connected to the WebDAV Server, for example as direct-attached storage, or a storage area network (SAN), or a network attached storage (NAS), or an Object Storage Device (OSD).

FIG. 4 depicts a conventional client implementation of an HTTP GET request with caching. An example of a conventional WebDAV client performing a cached HTTP GET request. In this example an application program issues a request to read a sequence of bytes from a file, for example by using a POSIX seek( ) and read( ) function calls. The file is, for example, hosted on a WebDAV server as a web resource. The WebDAV client receives this read request because the file is being served by a WebDAV server. The WebDAV client checks to see if the requested data already exists within its cache. If the requested data exists in the cache of the WebDAV client, the WebDAV client reads the data from the cache, and a response is returned to the implementation of the read request with appropriate bytes of data. If the requested data does not exist in the cache of the WebDAV client, an HTTP GET request is sent by the WebDAV client to the WebDAV server. As stated in the above paragraphs, instead of reading or downloading exactly the requested data from the file, the WebDAV client either sends a request to the WebDAV server to GET the entire file, or sends a request to GET a larger portion of the file, exceeding the number of bytes originally requested by the read request. The WebDAV server responds to the WebDAV client with the data that the WebDAV client requested. For example, the data can be entire file or a larger portion of the file greater than the size of the data requested by the read request. The WebDAV client retains the data within its local cache, by storing it to the local cache. The WebDAV client returns the bytes requested by the read request to the application program that had made the read request. Generally, a conventional implementation of a file read request uses a starting offset within a file from which point to start the read request. In addition, it uses the number of bytes to read from that starting offset from the file. In addition, it uses a pre-allocated location in computer memory (also known as a memory buffer) to receive the requested bytes from the file. For example, a description of such functions or procedures can be found in the published documentation on the POSIX function pread( ), a combination of POSIX functions lseek( ) followed by read( ), a combination of POSIX functions fseek( ) followed by fread( ). All these POSIX function calls result in the issuance of a read request to read a portion of a file by an application program. As another example, function calls proprietary to the Microsoft® Windows® operating system, for example, ReadFile( ), and ReadFileEx( ) are also examples of function calls that result in the issuance of a read request to read a portion of a file by an application program.

Conventional WebDAV clients assume that an application program will make subsequent read requests from the same file and therefore will utilize the cached data to its advantage and increase overall performance. This is based on the premise that an application program will request for the cached data at a later time prior to the cache being full.

If the requesting application program does not require additional data from that file, or if the requesting application program is accessing small parts of a large quantity of files, or if the requesting application program is accessing small disparate parts of a very large file, for example, a multi-terabyte file, the conventional WebDAV client's performance suffers.

If a significant number of application programs access a significant number of files, in parallel, from one computer system, a WebDAV client that is serving these requests on that computer system can receive a seemingly random pattern of read requests. Generally, the size of a cache is limited relative to the collective sizes of all the data being requested. If a cache is full, a WebDAV client needs to remove parts of the data that the client had retained from the cache. The data stored in the cache is, therefore, erased when cache space is needed to store additional data. As a result, in order for a lookup into a cache to be successful for a specific read request, a prior read request for the same data must have occurred prior to the moment where the WebDAV client's cache manager was forced to remove or erase that data from the cache because the cache filled up. The overhead for cache searches renders caching inefficient if most cache lookups do not result in requested data being returned from the cache.

As computer networks increase in speed, reduce in latency, as storage devices become denser in capacity and faster in performance, as files become extensively numerous (e.g. billions), and as files become larger in size (e.g. hundreds of GB to tens of TB), a significant portion of data access patterns becomes random. If such access patterns result in the local cache being rarely accessed, the conventional method of implementing a WebDAV client becomes inefficient. In the following paragraphs, a method for explicit access, according to an embodiment of the present invention, is described. Explicit access is defined as a method of implementing a WebDAV client that bypasses all forms of system caching. One benefit provided by explicit access WebDAV clients is the ability to deliver higher performance and scalability under the circumstances where conventional cached WebDAV clients result in slow performance.

In one embodiment, the method of explicit access implemented by the WebDAV client can directly send the exact byte-range of the read request to the WebDAV server. The WebDAV client does not check a local cache because the WebDAV client does not perform any local caching. The response from the WebDAV server is processed by the Web- DAV client, and the requested bytes are sent to the requesting application. These bytes are directly sent to the application making the file read request. These bytes are then discarded or deleted by the WebDAV client. The bytes from the file are not cached, i.e., not retained in the WebDAV client's computer memory, or stored by the WebDAV client on a computer storage device for future use.

FIG. 5 is a flow chart depicting a WebDAV client implementing a method for explicit access, according to an embodiment of the present invention. As shown in FIG. 5, an application program 10 issues a file read request to WebDAV client 12 for a file hosted by a WebDAV server 14, at S102. The file read request asks for at least a portion of a data file, for example a range of bytes within a file, starting from a specific location within the file. Since the file is being hosted by a WebDAV server 14, the WebDAV client 12 processes this request. The file read request is received by the WebDAV client 12, at S104. As part of the original read request from the application program, the WebDAV client 12 receives a memory buffer from the file read request for holding the response from the WebDAV server comprising of the requested data bytes. The WebDAV client 12 sends an HTTP GET byte-range request to the WebDAV server 14, at S106, through a network such as a LAN, WAN and/or the Internet. The HTTP GET byte-range request is made such that the exact number of bytes that were requested by the application program's file read request is also requested by the HTTP GET byte-range request. Not a single byte of extra data from the file is requested. The WebDAV server 14 receives and processes the read request. The WebDAV server 14 responds to the WebDAV client 12 with the exact number of bytes that are requested. The WebDAV client 12 receives these bytes into the memory buffer provided by the file read request at S108. Therefore, the file read request is fulfilled by the WebDAV Client 12. The WebDAV client 12 provides (e.g., sends, transmits, etc.), at S112, the requested bytes (i.e., the exact data) to the application program 10 in response to the file read request. The application program 10 issuing the file read request S102 receives the data. In one embodiment, the method includes deleting or erasing, by the WebDAV client, the exact data in the read request from memory. In one embodiment, the method includes, the WebDAV client waiting for a next read request to read at least a portion of the same data file or another data file.

The Explicit Access method applies to all types of read operations implemented within an operating system, for example POSIX functions to read parts or whole of a file such as lseek( ) followed by read( ) fseek( ) followed by fread( ), pread( ) and Microsoft Windows functions to read parts or whole of a file such as using SetFilePointer( ) or SetFilePointerEx( ) followed by ReadFile( ) or ReadFileEx( ), or just ReadFile( ), or just ReadFileEx( ). Depending on how these functions are implemented under an operating system implementation and depending on the settings of their parameters, the operating system may initiate a read of more than the requested number of bytes for pre-loading or buffering or caching. This is performed in anticipation that the computer program that made the prior read request, or any other program trying to access the cached data bytes on the same computer, may make additional requests to read the cached data. If the request to read part of a file was made on a file that exists on a file system mounted using WebDAV, this results in extra GET requests or a GET request for a much larger portion of data than is originally requested by the computer program issuing the read request. Although the file may be opened with Direct IO or unbuffered IO flags enabled, known conventional WebDAV client implementations do not honor the request to not buffer the data, for example the Microsoft® Windows® WebDAV client implementation.

If a file resides on a WebDAV file system, the explicit access method described herein bypasses the notion of buffering in all implementations of a file read request, only requesting for the desired byte-range, and no additional data. In a low-latency, high-speed network, such as a LAN, or a Private Cloud or a high speed Internet connection, for example those available using FIOS® products from VERIZON corporation, if a computer program is making requests for small or large chunks of data, and not requesting for other parts of the file, the Explicit Access method results in better performance under circumstances where caching (or buffering) is not necessary. On such a network, if a computer program is reading from a very large file, for example hundreds of megabytes to several gigabytes or several terabytes, and if the computer program is requesting a part of the file that is at an offset substantially farther away from a prior read request, such that the operating system cannot anticipate, nor can it practically cache the entire file in computer memory, the Explicit Access method emerges as a superior method.

Considering the case where, for example, a very large file of size 5,000 Gigabytes includes about 10,000 individual records of sizes ranging from 256 megabytes to 2 gigabytes. For example, the first 64 kilobytes of each record is all that a computer program needs, and the computer program has access to the offsets of the start of each record. The computer program may issue 10,000 file read requests, either in sequence, or in parallel, each for a 64 kilobyte chunk of data. The actual execution of multiple HTTP GET requests in parallel depends on the underlying computer network software, device drivers and hardware. Irrespective of whether this file is on a conventional file system such as NTFS, a network file system such as NFS, or a file system mounted via WebDAV, the operating system specific functions to read data from a file will attempt to cache the data for each read request. If the file is on a file system mounted via WebDAV, this results in GET byte-range requests being issued for more data than desired, most of which is not utilized. On the other hand, the explicit access method described herein applied to this example only issues 10,000 separate GET byte-range requests for 64 kilobytes. Depending on the implementation of this method by a WebDAV client, if the file read requests are issued in parallel, the corresponding GET byte-range requests can be dispatched in parallel, and if issued in sequence, they can be dispatched in sequence. As specified above, the actual execution of multiple HTTP GET requests in parallel depends on the underlying computer network software, device drivers and hardware. The response time and data transfer overhead over a network for such a request is substantially lower with the explicit access method than with a conventional method.

As it can be appreciated from the above paragraphs, a server program is a computer program that is configured to run on a computer system (e.g., a computer server having one or more processors), and a client program is a computer program that is configured to run on a computer system (e.g., a client computer having one or more processors). The computer systems running the client program and the server program can be the same or different computer systems. The computer system running the server program or the computer system running the client program, or both, can include one or more computers. The client program may be running on one or more computers. Similarly, the server program may be running on one or more computers. The computer systems running client programs and server programs communicate with each other over a network. The network may be a wired network, a wireless network (e.g., a cellular network), the internet, etc.

In some embodiments, programs for performing the methods or services in accordance with embodiments of the invention can be embodied as program products in a computer system such as a personal computer or server or in a distributed computing environment comprising a plurality of computers. The computer may include, for example, a desktop computer, a laptop computer, a handheld computing device such as a PDA, a tablet, etc. The computer program (e.g., server program, client program) products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods of the present invention.

Databases may be used and may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), NAS (network attached storage), Microsoft Access™ or others may also be used, incorporated, or accessed. The database may comprise one or more such databases that reside in one or more physical storage devices and in one or more physical locations. The database may store a plurality of types of data and/or files and associated data or file descriptions, administrative information, or any other data.

Although the various steps of the above method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed is:

1. A method for accessing data by a client computer system from a server computer system, the client computer system including one or more processors configured to execute computer program modules, the method comprising:
   receiving, by the client computer system from an application program, a read request to read at least a portion of a second virtual derived data file, the at least the portion of the second virtual derived data file being derived by the server computer system using at least a portion of a first data file and a first data file virtualization policy, the first data file and the first data file virtualization policy being previously stored in a storage device in communication with the server computer system;
   sending, by the client computer system to the server computer system, a request for the at least the portion of the second virtual derived data file requested by the application program in the read request;
   receiving, by the client computer system from the server computer system, a response to the request including the at least the portion of the second virtual derived data file requested by the client computer system; and
   providing, by the client computer system to the application program, the at least the portion of the second virtual derived data file in response to the read request.

2. The method according to claim 1, further comprising receiving, by the client computer system, a memory buffer from the read request for holding the response to the request including the at least the portion of the second virtual derived data file requested by the application program in the read request.

3. The method according to claim 2, wherein receiving the response comprises receiving, by the client computer system from the server computer system, the at least the portion of the second virtual derived data the requested into the memory buffer provided by the read request.

4. The method according to claim 1, wherein sending the request comprises sending, by the client computer system to the server computer system, the request for the at least the portion of the second virtual derived data file through a network.

5. The method according to claim 4, wherein the network includes a local area network (LAN), a wide area network (WAN), the internet, or any combination thereof.

6. The method according to claim 1, wherein sending the request for the at least the portion of the second virtual derived data file comprises sending, by the client computer system to the server computer system, an HTTP WebDAV GET byte-range request.

7. The method according to claim 1, wherein the client computer system and the server computer system communicate using the HTTP WebDAV communication protocol.

8. The method according to claim 1, wherein the at least the portion of the second virtual derived data file requested by the client computer system is not stored in a cache.

9. The method according to claim 1, wherein receiving the read request includes receiving a POSIX pread( ) function call.

10. The method according to claim 1, wherein the client computer system and the server computer system are the same computer system.

11. The method according to claim 1, further comprising deleting or erasing, by the client computer system, the at least the portion of the second virtual derived data file in the read request.

12. The method according to claim 1, further comprising awaiting for a next read request to read at least a portion of the same second virtual derived data file or another second virtual derived data file.

13. A client computer system for accessing data from a server computer system, the client computer system comprising one or more processors configured to:
  receive, from an application program, a read request to read at least a portion of a second virtual derived data file, the at least the portion of the second virtual derived data file being derived by the server computer system using at least a portion of a first data file and a first data file virtualization policy, the first data file and the first data file virtualization policy being previously stored in a storage device in communication with the server computer system;
  send, to the server computer system, a request for the at least the portion of the second virtual derived data file requested by the application program in the read request;
  receive, from the server computer system, a response to the request including the at least the portion of the second virtual derived data file requested; and
  provide, to the application program, the at least the portion of the second virtual derived data file in response to the read request.

14. The client computer system according to claim 13, wherein the one or more processors are configured to receive a memory buffer from the read request for holding the response to the request including the at least the portion of the second virtual derived data file requested by the application program in the read request.

15. The client computer system according to claim 14, wherein the one or more processors are configured to receive, from the server computer system, the at least the portion of the second virtual derived data the requested into the memory buffer provided by the read request.

16. The client computer system according to claim 13, wherein the one or more processors are configured to send, to the server computer system, the request for the at least the portion of the second virtual derived data file through a network.

17. The client computer system according to claim 16, wherein the network includes a local area network (LAN), a wide area network (WAN), the internet, or any combination thereof.

18. The client computer system according to claim 13, wherein the one or more processors are configured to send, to the server computer system, an HTTP WebDAV GET byte-range request.

19. The client computer system according to claim 13, wherein the one or more processors are configured to delete or erase the at least the portion of the second virtual derived data file in the read request.

20. The client computer system according to claim 13, wherein the one or more processors are configured to await for a next read request to read at least a portion of the same second virtual derived data file or another second virtual derived data file.

21. The method according to claim 1, further comprising:
  generating, by the client computer system, the first data file virtualization policy using a list of derived data types that are supported by the server computer system; and
  sending, by the client computer system to the server computer system, the first data file and the first data file virtualization policy for storage in the storage device, the first data file virtualization policy being useable by the server computer system to derive the at least the portion of the second virtual derived data file from the at least the portion of the first data file.

22. The client computer system according to claim 13, wherein the one or more processors are further configured to:
  generate the first data file virtualization policy using a list of derived data types that are supported by the server computer system; and
  send, to the server computer system, the first data file and the first data file virtualization policy for storage in the storage device, the first data file virtualization policy being useable by the server computer system to derive the at least the portion of the second virtual derived data file from the at least the portion of the first data file.

* * * * *